Oct. 28, 1969  H. S. AUSHERMAN  3,474,903
GRAIN DRYING AND DEBRIS SEPARATION DEVICE
Filed Oct. 22, 1968  2 Sheets-Sheet 1

INVENTOR.
HARRY S. AUSHERMAN
BY
John H. Widdowson
ATTORNEY

Oct. 28, 1969  H. S. AUSHERMAN  3,474,903
GRAIN DRYING AND DEBRIS SEPARATION DEVICE

Filed Oct. 22, 1968

INVENTOR.
HARRY S. AUSHERMAN
BY
John H. Widdowson
ATTORNEY

United States Patent Office 3,474,903
Patented Oct. 28, 1969

3,474,903
GRAIN DRYING AND DEBRIS SEPARATION DEVICE
Harry S. Ausherman, 715 Fairway,
Wichita, Kans. 67212
Filed Oct. 22, 1968, Ser. No. 769,623
Int. Cl. B07b 9/02, 1/46
U.S. Cl. 209—11                                   5 Claims

ABSTRACT OF THE DISCLOSURE

This invention is an apparatus for drying grain or other divided material in a continuous cycle of operation through the use of heated air passing therethrough to remove any moisture therein. More particularly, this invention relates to an improvement in a grain drying apparatus having a main perforated cylindrical dryer and an inside perforated wall enclosing a blower and heater assembly defining a plenum chamber to force hot air upwardly and laterally through the walls. A pair of conduits extend transversely of the dryer and the inside wall to convey inflammable debris therefrom. The heated combustion gases act to discharge the inflammable debris and the like from the plenum chamber without affecting the overall efficiency thereof.

---

It is known that the removing of moisture from grain and other such materials is very desirable and imperative to prevent the growth of mold and decay of the material. When grain and other crops are not consumed or processed immediately after harvest, drying has always been a popular and practical method of preservation. Also, in the production of flour, cattle feed, etc., the moisture content in the material must be reduced to a suitable level as such affects the cash price received therefore. For these reasons, it is economically feasible for the processors and handlers of grains and other products to own or have ready access to drying equipment which is efficient and capable of reducing the moisture content.

In the prior art devices, apparatuses have been developed and used but have not met with general acceptance, outside a very large farm operations or storage elevators. The prior art devices for grains and other divided materials are generally very large and expensive permanent installations which require specialized knowledge and skill to operate. It is seen that the average farmer and small grain handler or operator could not be extensively engaged in the drying of grain. Also, the known devices generally require a specialized technical knowledge for proper operation which knowledge is not possessed by a small farm operator or handler of grains. Very often with drying equipment known to the prior art, a current of very warm or hot air is passed through the grain, heating to a relatively high temperature. Normally, a great deal of this heat must be removed before the grain is stored in order to make sure that the seed will germinate, and also reduce the fire hazard in the event that insufficient moisture is not removed and heat is subsequently generated. In general, the grain drying apparatus known to the prior art does not include a simple, relatively inexpensive dryer which can be utilized by a small operator that is automatic in operation will produce uniform and consistent results. Further, the known grain dryers do not have facilities to quickly and efficiently cool the grain to a suitable temperature after it has been dried with a current of very warm air.

In a preferred specific embodiment of this invention, a grain dryer apparatus is provided having spaced pervious walls adapted to receive material therebetween to be dried with a chamber formed at least in part by one of the walls. A duct is provided having an outlet within the chamber and a blower means is connected to the duct for providing a current of air across the spaced pervious walls. An auger and conveyor means is provided to remove material disposed between the spaced perforated walls that moves downwardly under the force of gravity. The chamber is divided into two compartments with a solid wall partition, namely, an inlet chamber and a plenum chamber. The duct means communicates with opposite sides of the partition and in use transfers air from the inlet chamber to draw air through a lower portion of the spaced pervious walls to provide the input air and expels air to the plenum chamber of the spaced pervious walls. Preferably, a burner means or other means for providing heat is mounted within the duct area. The grain or other material moving through the spaced walls is first hit with heated air and the input air moves through a lower portion thereof to provide for the subsequent cooling of the material. The apparatus of this invention can be easily adjusted to vary moisture content of the dried grain by varying the rate the grain is passed through the apparatus and the temperature of the current of air to thereby enable the apparatus to be used under widely changing conditions and meet varying moisture content demands. The improvement of this grain dryer apparatus provides for a solid wall partition at the lower end of the inner wall whereupon input air cannot be drawn from the area of the auger and conveyor means but instead must move laterally through the perforated walls and, therefore, prevents various debris such as found in corn and the like from being pulled inwardly to the inlet chamber by the blower assembly and forced upwardly into the upper plenum chamber. Although, minute particles may be pulled within the duct and upwardly into the plenum chamber, a pair of opposed conduit members extend transversely of the spaced pervious walls so that the hot air gases and increased pressure in the upper plenum chamber forces the debris found upon the solid partition wall outwardly through the spaced conduits externally of the entire apparatus thereby providing a safety feature so that the debris does not ignite due to the heater element therein.

One object of this invention is to provide an improved grain drying apparatus overcoming the aforementioned disadvantages of the prior art devices.

Another object of this invention is to provide a grain drying apparatus which is practical for usage by the average farmer or small grain operator.

One other object of this invention is to provide an improved grain drying apparatus operable through a continuous cycle being automatic in operation.

One further object of this invention is to provide an improved grain drying apparatus which in use will dry the grain with a hot current of air and immediately thereafter cool the resultant hot dry grain with a cool current of air plus having safety features to assure that any inflammable debris or the like will be forced outwardly therefrom so as to not create a fire hazard.

Still, one other object of this invention is to provide an improved grain drying apparatus having enclosed central heating area having an inlet chamber and a plenum chamber completely enclosed by a solid bottom wall partition, a solid intermediate wall partition, and pervious upright walls to hinder the movement of inflammable debris and the like therein for safety purposes.

Another such object of this invention is to provide an improved grain drying apparatus having safety features so that the same may be used under all conditions notwithstanding the type of material being dried therein and being simple to operate, relatively inexpensive to manufacture, automatic and adjustable in operation, and substantially maintenance free.

Various other objects, advantages and features of the invention will become apparent to those skilled in the art from the following discussion, taken in conjunction with the accompanying drawings, in which.

Figure 1:
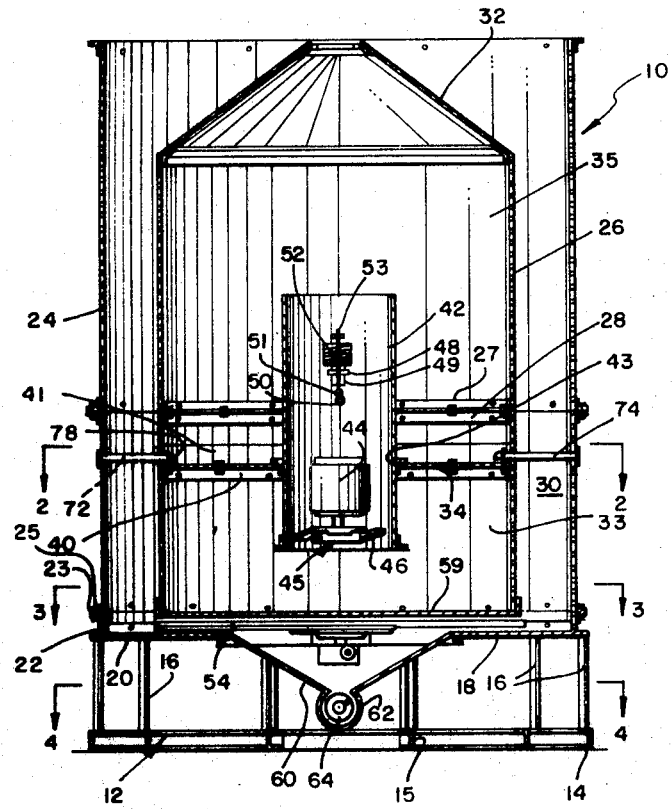
FIG. 1 is a view in vertical cross-section of the improved grain drying apparatus of this invention.

The following is a discussion and description of preferred specific embodiments of the new and improved grain drying apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular FIG. 1, the improved dryer apparatus of this invention, indicated generally at 10, has a base 12 consisting of a circular channel iron 14 with spaced cross braces 15 positioned in chord relation to the channel iron 14. A plurality of spaced upright legs 16 are mounted on the base 12. A metering means are mounted above base 12 to remove material from the dryer apparatus 10 at a constant controlled rate. The operation and structure of the metering means includes a housing 18, and a rotatable element provided with metering arms overlying the housing which has been described in detail in the prior filed application, now patent entitled "Grain Drying Apparatus," issued Aug. 1, 1967, No. 3,333,348. Therefore, the details of the operation of the power means and auger means of this improved grain drying apparatus is identical to the above-mentioned issued patent and detailed description thereof is not deemed necessary.

The housing 18 is mounted on the legs 16 having a flat annular shaped floor 20 connected to an upright cylindrically shaped upright wall 22. The top portion of the upright wall 22 is provided with an outwardly extending flange 23 on the lower end which is bolted to a flange of the agitator housing 18. An upright perforated outer wall 24 is secured to the housing 18 through a flange 25 which is bolted to the flange 23. The outer wall 24 can be made in upper or lower sections with the sections joined together through outwardly extended flanges as by bolts. An upright perforated cylindrically shaped inner wall 26 is positioned in spaced and concentric relation to the outer wall 24. The inner wall 26 is of a height less than the outer wall 24 and is constructed in two sections, namely, an upper section and a lower section which are provided with inwardly extended flanges 27 and 28 bolted together. The outer and inner walls 24 and 26, respectively, are preferably constructed of a perforated steel plate with the size and spacing of the holes therethrough selected to best accommodate the material intended to be dried in the dryer apparatus 10.

Figure 2:
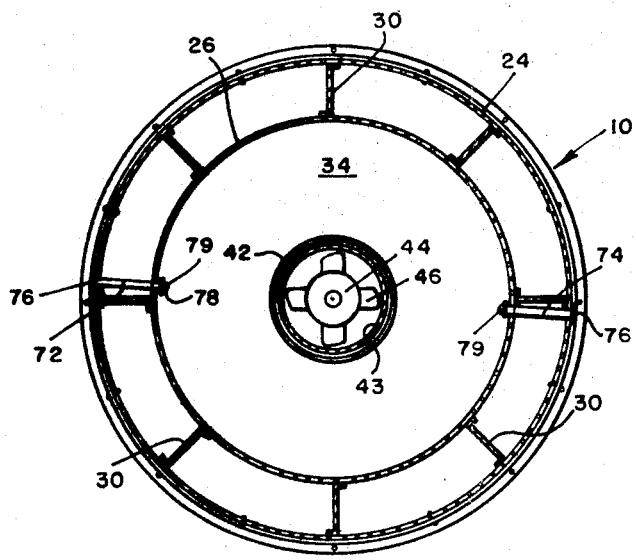
FIG. 2 is a sectional view taken along line 2—2 in FIG. 1.
Figure 3:
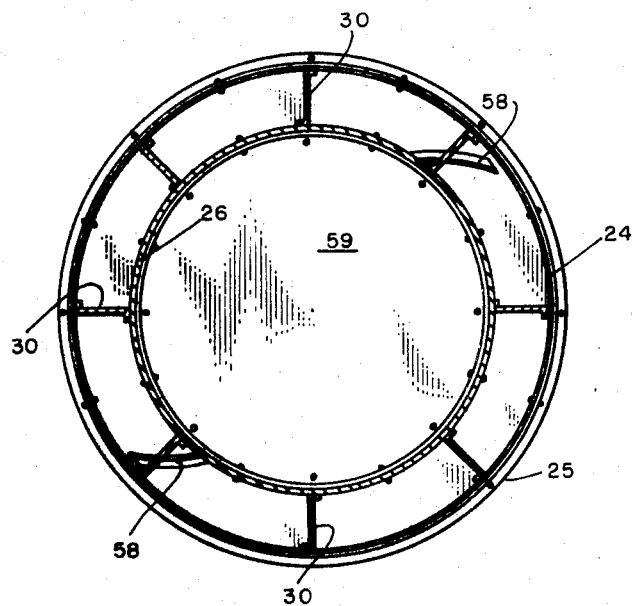
FIG. 3 is a view taken along line 3—3 in FIG. 1.

As shown in FIG. 1, the bottom end of the inner wall 26 is spaced a distance above the floor 20 of the agitator housing 18 for reasons to become obvious. A plurality of upright circumferentially spaced flat structural members 30 are secured to the outer wall 24 and the inner wall 26 as best shown in FIG. 2. A frusto-conical shaped diverter hood 32 secured to the top edge of the inner wall 26 forms with the outside wall 24 a hopper adapted to receive and hold a quantity of material to be dried.

It is seen that the inner wall 26 and the interconnected hood 32 forms an enclosure having a lower intake chamber indicated at 33 and an upper plenum chamber indicated at 35. An annular shaped flat horizontal partition 34 of a solid material is secured to the inner wall 26 to divide the enclosure into the plenum chamber 33 and the lower intake or inlet chamber 33. The partition 34 is preferably constructed of a sheet metal which is secured to the inner wall 26 by bolting the same to a flange 40. A band 41 of L-shape in transverse cross-section is secured to the upper surface of the partition 34 and the inner wall 26 as by bolts. The band 41 extends a substantial distance above the partition 34 for reasons to become obvious. A cylindrically shaped duct 42 is mounted in a vertical position in a central aperture 43 of the partition 34. A blower 45 is mounted in the lower end of the duct 43 as best shown in FIG. 1. The blower 45 is adapted to transfer air from the lower air inlet chamber 33 to the upper plenum chamber 35 and has a motor 44 with a horizontally disposed fan 46 connected thereto. The motor 44 is suitably secured to the duct 42 and wiring means is provided adapted to conduct electricity to the motor 44 as required.

A burner 48 is mounted in the upper portion of the duct 43 having a cylindrically shaped firing chamber 49, a conduit 50 for compressed air, and a conduit 51 for fuel thereto. Preferably, the fuel is heated by passing same through a coil 52 disposed about the firing chamber 49 prior to its introduction into the plenum chamber 35. An ignition 53 is also provided on the burner 48 although it is obvious that any other suitable type of burner or heating means can be substituted for the burner 48. It is seen that the blower 45 will in use draw a current of cool air from the exterior of the entire apparatus 10 across the annular space between inner and outer walls 26 and 24 into the air intake chamber 33, below the solid partition 34, and direct the air upwardly past the burner 48 and into the upper plenum chamber 35. The heated air in the upper chamber 35 will then be forced across the annular space between the outer and inner walls 24 and 26 above the partition 34 to heat and dry the grain contained therein. It is seen, therefore, in use, the grain in the annular space above the partition 34 is heated and dried and subsequently cooled in the space below the partition 34.

An agitator 54 is mounted in the agitator housing 18 and rotatable about a vertical central axis. The agitator 54 has a hub 56, a plurality of arcuate shaped arms 58, and brace means securing the arms 58 to the hub 56 in a rigid relation with the outer ends of the arms 58 moving in close but spaced relation to the outer wall 22 of the agitator housing 18. Between the inner wall 26 and immediately above the spaced arcuate shaped arms 58, it is seen that a solid floor 59 is provided so that material moving inwardly through use of the arcuate arms 58 is conveyed and held therebetween and moved downwardly into a conveyor auger 64 so that debris or the like in the material being moved is not pulled downwardly into the air inlet chamber 33 by the action of the blower 45.

Figure 4:
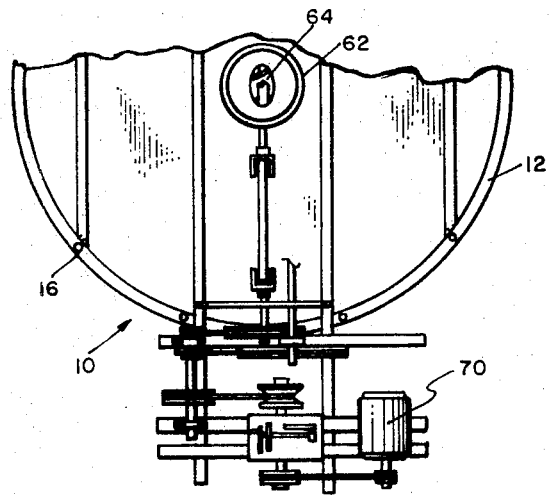
FIG. 4 is a fragmentary sectional view taken along line 4—4 in FIG. 1.
Figure 5:
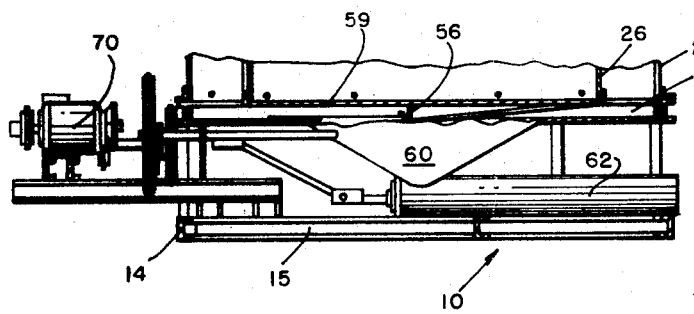
FIG. 5 is a side elevational view, in broken sections, illustrating the structure of the agitator and conveyor means of the grain drying apparatus of this invention.

A frusto-conical shaped hopper 60 is connected to the base floor 20 and positioned to receive dried material from the space between the outer and inner walls 24 and 26. A conveyor housing 62 is connected to the outlet opening of the hopper 60 to receive material therefrom. A conveyor auger 64 is disposed in the conveyor housing 62 so as to remove dried material from the lower portion of the annular space between the inner and outer walls 24 and 26 to be deposited into the hopper 60. The material will then be received in the conveyor housing 62 and conveyed outwardly by the conveyor auger 64. It is seen that the removal of material between the outer and inner walls 24 and 26 is directly proportional to the rotational velocity of the agitator 54. The power means for the agitator 54 and the conveyor auger 64 is provided and illustrated in FIGS. 4 and 5 having an electric motor 70, a plurality of shaft members, and pulley members operable to provide the proper rotation thereto as previously described in the applicant's issued Patent No. 3,333,348, and further discussion thereof is not deemed necessary.

As best shown in FIGS. 1 and 2, a pair of substantially diametrically opposed conduit members 72 and 74 are provided having the same extended transversely of the annular space between the outer and inner walls 24 and 26 and secured thereto in a rigid manner. It is seen that the conduits 72 and 74 are positioned so as to have an output end 76 outwardly of the outer wall 24 with an inlet end 78 connected to an elbow member 79 extended downwardly so as to have the intake portion positioned adjacent to the upper surface of the solid wall partition 34. The conduits 72 and 74 operate as pressure releasing channels for removing debric from the inner plenum chamber 35 as will be explained.

In the use and operation of the improved grain drying apparatus 10, it is seen that the same is substantially similar to that previously described in the issued Patent No. 3,333,348 wherein the blower 45 will draw in air directly from the outside through the outer and inner walls 24 and 26 into the inlet chamber 33 for directing the same into the duct 43 through the use of the blower 45. In other words, it is seen that the blower 45 would draw air directly from the outside and heat the air by passing the same across the burner 48 and force the heated air upwardly and outwardly through and across the inner and outer perforate walls 26 and 24 to dry grain or other material disposed therein. The heated air is blown outwardly through the grain being dried throughout the overall upper length of the spaced walls between the solid wall partition 34 and the uppermost point of the hood 32. The agitator 54 and auger conveyor 64 operate to remove the dried material therefrom at a predetermined rate dependent upon the moisture content desired in the final end product.

The main items of improvement in this grain drying apparatus 10 lies in the provision of the lowermost solid floor 59 adjacent and above the arcuate shaped arms 58 so that debris contained within the material is not readily movable inwardly into the inlet chamber 33. Also, the solid wall partition 34 assures that all air and any possible material moved into the inlet chamber 33 is pulled upwardly by the blower 45 past the burner 48 and into the upper plenum chamber 35. When the heated gases reach the plenum chamber 35, it is obvious that the expanding action thereof forces the air through the inner to the outer walls 26 and 24, respectively, to dry the grain therebetween. Any debris which may have passed into or been pulled through the lower perforate inner wall 26 into the inlet chamber 33 and thereupon moved upwardly by the blower 45, tends to fall downwardly in the plenum chamber 35 to rest upon the solid wall partition 34. Because of the higher pressure contained therein due to the heating of the air and the blower 45 forcing air into the plenum chamber 35, it is obvious that the material contained therein is blown outwardly through the conduits 72 and 74 due to this increased pressure relative to the atmospheric pressure on the outside of the outer wall 24. This operates to automatically remove any debris contained in the upper plenum chamber 35 in a most efficient and effective manner thereby removing any fire hazard which could be occurred by the accumulation of chaff and debris in the grain drying apparatus 10.

Figure 6:
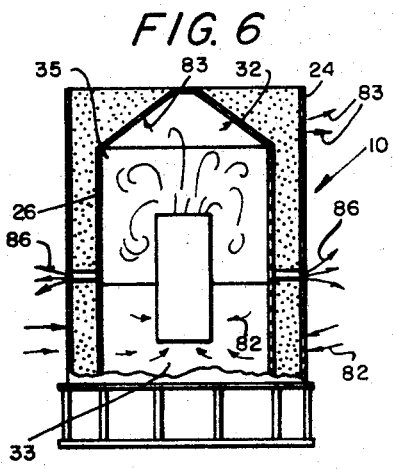
FIG. 6 is a schematic diagram illustrating the operation of the improved grain drying apparatus of this invention.

The use and operation of this invention is clearly shown in FIG. 6 whereupon the arrows 82 indicate the input air moving into the lower inlet chamber 33 and moving upwardly into the plenum chamber 35 indicated by the arrows 83 and finally outwardly through the inner and outer walls 26 and 24. Additionally, a certain leakage of the heated gas and air moves outwardly through the conduits 72 and 74 as shown by the arrows 86 to carry debris therewith.

The improved drying apparatus of this invention solves most of the problems associated with the drying apparatus known to the prior art and provides for a continuous cycle of operation which will quickly, efficiently, and uniformly dry grains and other such materials. The improved grain dryer apparatus provides numerous safety features therein to assure that chaff, debris, and other such foreign materials which are inflammable will not catch on fire by the heating element therein through the cycling operation of this invention. The dryer apparatus of this invention is simple to operate, relatively inexpensive, and can be used by farmers and small handlers of grain but could also be advantageously used by large grain handlers. An improved means is provided to remove the grain in a uniform rate from between the spaced pervious walls after it has been dried and convey same to a desired location, as for example, to a storage unit, wagon vehicle, or the like. The means for removing the grain was adapted to utilize a single source of power as an electric motor thereby reducing the size of the capital investment involved. Additionally, the grain drying apparatus of this invention can be easily adjusted to vary moisture content of the dried grain by varying the rate of the grain being passed through the apparatus, the temperature of the current of air, and thereby enable the apparatus to be used under widely varying conditions and moisture content demands. The apparatus of this invention can also be easily repaired and quickly disassembled for maintenance and repair.

While the invention has been described in conjunction with preferred specific embodiments thereof, it is understood that this description is intended to illustrate and not to limit the scope of the invention, which is defined by the following claims.

I claim:
1. A dryer apparatus for drying grain or the like, comprising:
   (a) a substantially horizontally extended floor member,
   (b) spaced pervious concentric walls adapted to receive the material to be dried positioned over said floor to direct material onto said floor,
   (c) a solid partition means having an aperture therein across the inner one of said walls forming an upper plenum chamber and a lower inlet chamber,
   (d) a duct means mounted in said partition means communicating between said inlet chamber and said plenum chamber,
   (e) blower and burner means mounted in said duct means,
   (f) a solid floor member extended between the lower edge portion of the inner one of said walls thereby enclosing said inlet chamber whereupon inlet air can only move transversely of the inner one of said walls, and
   (g) conduit means extended transversely of said pervious walls and having an inlet in the lower portion of said upper plenum chamber and an outlet to atmosphere to release air from within said plenum chamber to carry debris and the like therewith for discharge from said plenum chamber for safety reasons.
2. A dryer apparatus as described in claim 1, wherein:
   (a) said conduit means comprising a pair of spaced conduit members positioned adjacent and above said partition means to receive debris and the like thereon and convey the same transversely of said walls to prevent accumulation thereof which would be a fire hazard.
3. A dryer apparatus as described in claim 1, wherein:
   (a) said conduit means including an L-shaped band member secured to the inner surface of the inner one of said walls having a lower leg thereof bolted to said partition means to provide an annular band thereabout to contain debris thereon, and a conduit member extended transversely of said walls having an intake section position adjacent said partition means cooperating with said band member to receive and release air pressure from said plenum chamber for discharge outwardly of said dryer apparatus.

4. A dryer apparatus as described in claim 2, wherein:
  (a) said conduit members having an elbow member secured to inner ends thereof directed downwardly to be positioned adjacent the surface of said partition means to provide an efficient and effective means for providing an air pressure release therein to convey air and debris transversely thereof without affecting the overall efficiency and effectiveness of the dryer apparatus due to the small size of the conduit members relative to the overall said pervious walls extended above the said partition means.

5. A dryer apparatus as described in claim 1, wherein:
  (a) said partition means being a solid plate member having its inner edges secured as by flange member to said duct and the inner one of the outer circumference thereof secured as by bolt members to said walls, and
  (b) said conduit means including a conduit member and an annular band member of L-shape in transverse cross-section having a horizontal leg secured to said partition means and an upright leg extended upwardly therefrom and above said conduit member to assure transverse movement of any debris on said partition means into the input section of said conduit for movement transversely of said dryer apparatus.

References Cited

UNITED STATES PATENTS

| | | | |
|---|---|---|---|
| 1,307,075 | 6/1919 | Belton | 34—235 X |
| 2,493,218 | 1/1950 | Bergstrom | 209—135 X |
| 3,333,348 | 8/1967 | Ausherman | 34—174 |

FRANK W. LUTTER, Primary Examiner

U.S. Cl. X.R.

34—174, 175; 209—135